(12) United States Patent  
Schmidlin

(10) Patent No.: US 12,545,811 B2  
(45) Date of Patent: Feb. 10, 2026

(54) ADHESIVE TAPE FOR JACKETING ELONGATED ITEMS SUCH AS MORE PARTICULARLY CABLE HARNESSES AND METHOD FOR JACKETING

(71) Applicant: TESA SE, Norderstedt (DE)

(72) Inventor: Andreas Schmidlin, Guderhandviertel (DE)

(73) Assignee: Tesa SE, Norderstedt (DE)

( * ) Notice: Subject to any disclaimer, the term of this patent is extended or adjusted under 35 U.S.C. 154(b) by 550 days.

(21) Appl. No.: 17/680,852

(22) Filed: Feb. 25, 2022

(65) Prior Publication Data

US 2022/0275249 A1    Sep. 1, 2022

(30) Foreign Application Priority Data

Feb. 26, 2021   (DE) ................ 10 2021 201 856.4

(51) Int. Cl.
*C09J 7/21* (2018.01)
*B32B 5/02* (2006.01)
(Continued)

(52) U.S. Cl.
CPC .............. *C09J 7/21* (2018.01); *B32B 5/022* (2013.01); *B32B 5/024* (2013.01); *B32B 7/12* (2013.01);
(Continued)

(58) Field of Classification Search
CPC ....... Y10T 428/24942; Y10T 428/2495; Y10T 428/24959; Y10T 428/24967; Y10T 428/26; Y10T 428/266; Y10T 428/269; Y10T 428/27; Y10T 428/273; Y10T 428/28; Y10T 428/2804; Y10T 428/2848; Y10T 428/2852; Y10T 428/2878;
(Continued)

(56) References Cited

U.S. PATENT DOCUMENTS 6,166,326 A * 12/2000 Nakajima .......... H01B 11/1826  
174/36  
6,432,529 B1  8/2002 Harder et al.  
(Continued)

FOREIGN PATENT DOCUMENTS

CN    101298540 A    11/2008  
CN    106967371 A    7/2017  
(Continued)

*Primary Examiner* — Maria V Ewald  
*Assistant Examiner* — Ethan A. Utt  
(74) *Attorney, Agent, or Firm* — Norris McLaughlin, P.A.

(57) ABSTRACT

The invention relates to adhesive tape, especially for lengthwise jacketing of elongate items such as cable harnesses in a motor vehicle, comprising a carrier having a top side and a bottom side, where the carrier, based on the cross direction, has a width BT, and at least one layer of adhesive applied on the bottom side of the carrier, the adhesive layer bearing a second carrier, the first carrier with the adhesive layer protrudes at least on one long edge relative to a side edge of the second carrier, where the first protrusion has a width of $B_{start}$, characterized in that the first carrier is a woven fabric or a nonwoven fabric and the second carrier is a metallic layer, and the first carrier has a basis weight of 50 g/m2 to 600 g/m2.

12 Claims, 6 Drawing Sheets

(51) Int. Cl.
*B32B 7/12* (2006.01)
*B32B 15/14* (2006.01)
*B32B 15/18* (2006.01)
*B32B 15/20* (2006.01)
*B60R 16/02* (2006.01)
*C09J 5/00* (2006.01)
*C09J 7/38* (2018.01)

(52) U.S. Cl.
CPC ............. *B32B 15/14* (2013.01); *B32B 15/18* (2013.01); *B32B 15/20* (2013.01); *C09J 5/00* (2013.01); *C09J 7/385* (2018.01); *B32B 2255/02* (2013.01); *B32B 2255/205* (2013.01); *B32B 2255/26* (2013.01); *B32B 2307/718* (2013.01); *B32B 2307/732* (2013.01); *B32B 2405/00* (2013.01); *B60R 16/0215* (2013.01); *C09J 2203/302* (2013.01); *C09J 2400/166* (2013.01); *C09J 2400/263* (2013.01)

(58) Field of Classification Search
CPC ....... Y10T 428/2891; Y10T 428/31678; Y10T 428/31681; Y10T 428/31692; Y10T 428/31699; Y10T 442/30; Y10T 442/3382; Y10T 442/339; Y10T 442/3398; Y10T 442/3407; Y10T 442/3415; Y10T 442/3423; Y10T 442/3431; Y10T 442/3439; Y10T 442/3447; Y10T 442/3463; Y10T 442/3472; Y10T 442/3504; Y10T 442/3707; Y10T 442/60; Y10T 442/654; Y10T 442/655; Y10T 442/656; Y10T 442/657; Y10T 442/658; Y10T 442/659; Y10T 442/66; Y10T 442/668; Y10T 442/669; Y10T 442/67; Y10T 442/671; Y10T 442/681; B32B 3/00; B32B 3/02; B32B 5/00; B32B 5/022; B32B 5/024; B32B 5/08; B32B 5/22; B32B 5/24; B32B 5/26; B32B 5/262; B32B 5/263; B32B 5/265; B32B 5/266; B32B 5/267; B32B 5/271; B32B 5/275; B32B 7/00; B32B 7/02; B32B 7/04; B32B 7/12; B32B 15/00; B32B 15/04; B32B 15/08; B32B 15/082; B32B 15/088; B32B 15/09; B32B 15/14; B32B 15/18; B32B 15/20; B32B 2405/00; C09J 7/00; C09J 7/20; C09J 7/21; C09J 7/22; C09J 7/25; C09J 7/255; C09J 7/28; C09J 7/29; C09J 7/30; C09J 7/38; C09J 7/381; C09J 7/385; C09J 133/04; C09J 133/06; C09J 133/08; C09J 133/10; C09J 133/12; C09J 2203/00; C09J 2203/302; C90J 133/00; H01B 3/00; H01B 3/008; H01B 3/02; H01B 3/025; H01B 3/18; H01B 3/30; H01B 3/42; H01B 3/421; H01B 3/48; H01B 3/485; H01B 3/50; H01B 7/00; H01B 7/0045; H01B 7/02; H01B 7/0208; H01B 7/0216; H01B 7/0225; H01B 7/0258; H01B 7/0291; H01B 7/04; H01B 7/36; H01B 7/365
USPC ......... 428/77, 212, 213, 214, 215, 219, 220, 428/332, 337, 339, 340, 341, 343, 344, 428/354, 355 EN, 355 AC, 458, 461, 463, 428/457; 442/181, 228, 229, 230, 231, 442/232, 233, 234, 235, 238, 239, 243, 442/255, 263, 268, 327, 330, 331, 332, 442/376, 277, 378, 379, 381, 389, 391, 442/401, 390; 176/68.1, 110 R, 113 R, 176/114, 5, 120 R, 121 R, 121 SR, 122 R, 176/120 SR, 124 R, 137 R, 168, 174, 175
See application file for complete search history.

(56) References Cited

U.S. PATENT DOCUMENTS

| | | | |
|---|---|---|---|
| 6,541,707 | B2 | 4/2003 | Kuelper et al. |
| 6,613,870 | B1 | 9/2003 | Harder et al. |
| 7,279,541 | B2 | 10/2007 | Centner et al. |
| 8,815,389 | B2 | 8/2014 | Kuelper et al. |
| 9,023,447 | B2 | 5/2015 | Siebert et al. |
| 9,338,933 | B2 | 5/2016 | Cataldo et al. |
| 9,349,506 | B2 | 5/2016 | Toyama et al. |
| 9,550,461 | B2 | 1/2017 | Nakai et al. |
| 9,676,349 | B2 | 6/2017 | Kanagawa |
| 9,725,622 | B2 | 8/2017 | Korthals et al. |
| 10,395,803 | B2 | 8/2019 | Hohmann et al. |
| 10,519,344 | B2 | 12/2019 | Korthals et al. |
| 10,519,345 | B2 | 12/2019 | Korthals et al. |
| 11,081,255 | B2 | 8/2021 | Frigge et al. |
| 12,187,926 | B2 * | 1/2025 | Schmidlin ................ C09J 7/21 |
| 2004/0253889 | A1 | 12/2004 | Mundt |
| 2008/0261012 | A1 | 10/2008 | Koft et al. |
| 2008/0286568 | A1 | 11/2008 | Kopf et al. |
| 2012/0231230 | A1 * | 9/2012 | Siebert ..................... C09J 7/21 428/222 |
| 2012/0279637 | A1 | 11/2012 | Siebert et al. |
| 2013/0112473 | A1 * | 5/2013 | Toyama ............. B60R 16/0215 174/70 R |
| 2016/0032150 | A1 | 2/2016 | Guenzler et al. |
| 2017/0198173 | A1 * | 7/2017 | Frigge .................... C09J 183/00 |
| 2017/0271051 | A1 * | 9/2017 | Hohmann ............... B32B 29/02 |
| 2019/0284439 | A1 | 9/2019 | Kerep et al. |
| 2020/0199410 | A1 * | 6/2020 | Leermann ................ C09J 5/00 |

FOREIGN PATENT DOCUMENTS

| | | |
|---|---|---|
| CN | 107107530 A | 8/2017 |
| DE | 43 13 008 C1 | 11/1994 |
| DE | 198 07 752 A1 | 8/1999 |
| DE | 101 01 051 A1 | 8/2001 |
| DE | 100 11 788 A1 | 3/2002 |
| DE | 10 2011 005 162 A1 | 9/2012 |
| DE | 10 2014 113 769 A1 | 3/2016 |
| DE | 102007018381 A1 | 10/2018 |
| DE | 10 2018 000 140 A1 | 7/2019 |
| EP | 0 578 151 A1 | 1/1994 |
| EP | 1 378 527 B1 | 1/2004 |
| EP | 1448744 A1 | 8/2004 |
| EP | 1615238 A1 | 1/2006 |
| EP | 1722968 B1 | 11/2006 |
| EP | 1723210 B1 | 11/2006 |
| EP | 1 911 824 A1 | 4/2008 |
| EP | 2 034 576 A1 | 3/2009 |
| EP | 2 520 627 A1 | 11/2012 |
| EP | 2 520 628 A1 | 11/2012 |
| EP | 2 520 629 A1 | 11/2012 |
| EP | 2 522 705 A1 | 11/2012 |
| EP | 2 597 740 A1 | 5/2013 |
| EP | 2 695 926 A1 | 2/2014 |
| EP | 2847838 A2 | 3/2015 |
| EP | 3245265 A1 | 11/2017 |
| EP | 3 540 024 A1 | 9/2019 |
| JP | 2016-046901 A1 | 4/2016 |
| WO | 03/033611 A1 | 4/2003 |
| WO | 2013/167712 A2 | 11/2013 |
| WO | 2015/049980 A1 | 4/2015 |
| WO | 2016/113132 A1 | 7/2016 |
| WO | WO-2016113132-A1072016 | * 7/2016 ................ C09J 5/00 |
| WO | 2019/138829 A1 | 7/2019 |

* cited by examiner

ADHESIVE TAPE FOR JACKETING ELONGATED ITEMS SUCH AS MORE PARTICULARLY CABLE HARNESSES AND METHOD FOR JACKETING

This application claims priority of German Patent Application No. 10 2021 201 856.4 filed Feb. 26, 2021, the entire contents of which patent application are hereby incorporated herein by reference.

The invention pertains to an adhesive tape for jacketing elongated items such as more particularly cable harnesses in motor vehicles, to methods for using the adhesive tape and also to methods for producing a shielded cable loom.

It is known practice in the prior art to use adhesive tapes in order to bundle cable looms before they are installed in the motor vehicle, in order to adapt cable looms for the installation scenario, and in order to equip defined regions with various kinds of protective function. The adhesive tapes here fulfil very different functions. In addition to bundling for installation in scenarios where space is limited, a weight-saving adaptation is desirable. For protection from service media used, such as lubricating oils, hydraulic force transmission media and washing liquids, it is possible to use film-based carrier materials or particularly impervious textile carrier materials. With lofty and voluminous adhesive tapes based on thick nonwoven or foam material carriers, damping properties are obtained; when stable, abrasion-resistant carrier materials are used, a protective function with respect to scuffing and rubbing is achieved. Particular protection against impact exposure is attained through abrasion-resistant woven fabrics with additionally applied coatings.

In order to improve the damping and to increase the abrasion resistance, there are known adhesive tapes whose carriers consist of a plurality of layers.

EP 1 722 968 A1 discloses a highly abrasion-resistant tape for the bandaging of cable looms, especially in motor vehicles, composed of a carrier having a first outer layer A and a second outer layer B, there being located between the outer layers A and B an interlayer C, which is firmly connected to each of the outer layers A and B over the entire area of said layers. The outer layers A and B consist of a woven or knitted fabric, and the interlayer C consists of a viscoelastic adhesive, preferably a self-adhesive composition, or of a double-sidedly adhesively furnished adhesive tape.

EP 1 723 210 A1 discloses a highly abrasion-resistant and noise-damping tape for the bandaging of cable looms, this tape consisting of a carrier having a first outer layer A, connected firmly to a second layer C over the entire area of the outer layer A.

The outer layer A may be of velour, laid, woven or knitted fabric; the layer C may be a porous sheetlike structure such as a textile having an open yet stable three-dimensional structure, such as a foam or such as a foamed film.

Both outer layers have the same width and are joined to one another in each case over their entire area by means of a further layer of adhesive, without offset, so that the side edges of the layers finish flush.

EP 1 911 824 A1 accordingly describes a cable wrapping tape having a tapelike carrier in the form of an assembly of a woven fabric and a nonwoven web, this carrier being furnished on at least one side over the full area with a self-adhesive, pressure-sensitive adhesive layer. The woven fabric has at least 20 warp threads per cm and at most 22 weft threads per cm. Here as well, both textile plies have the same width and are joined to one another in each case over their entire area by means of a further layer of adhesive, without offset, so that their side edges finish flush.

The two-ply construction enables the adhesive tape to reach LV 312 abrasion class E on both a 5 mm diameter mandrel and a 10 mm diameter mandrel.

A cable loom is surrounded by the adhesive tape in a wrap in the form of a helical line.

However, the two materials laminated over the full area, as described in EP 1 723 210 A1 and EP 1 911 824 A1, produce a relatively high stiffness, which has deleterious consequences on spiral wrapping and which leads in particular to flagging at the tape ends. In the context of an adhesive tape wound around a body, flagging refers to the tendency of one end of the adhesive tape to stand proud. The reason lies in a combination of the holding force of the adhesive, the stiffness of the carrier and the diameter of the cable harness.

As a result of the full-area furnishing of the carrier with an adhesive coating, it is impossible to prevent contact between the adhesive and the cable jacketing.

This makes the cable loom very stiff, since the tape is joined to the cable loom at every point by the adhesive.

When a cable loom is jacketed in a helical line with the adhesive tape, the individual turns overlap one another, and consequently at these points there are four textile plies one over the other, which likewise results in a very stiff cable loom. On account solely of the thickness of the resulting cable loom, there is a risk which cannot be ruled out, given the narrow installation conditions which currently prevail in motor vehicle construction, of the adhesive tape being damaged at sharp edges, causing the cable bundling to tear.

EP 2 034 576 A1 describes an adhesive tape composed of a carrier and of an adhesive applied thereon, this tape having a largely tack-free inside surface, by the application—by lamination—to the adhesive layer of a second carrier, which has a narrower width than the first carrier.

A variety of embodiments are envisaged. For instance, the second carrier may run flush at one side edge with a side edge of the first carrier, with the first carrier protruding, with the adhesive layer, relative to the other side edge of the second carrier. The first carrier may also protrude, with the adhesive layer, on both sides relative to the side edges of the second carrier, or else provision can be made for the first carrier to protrude with the adhesive layer on one side relative to one side edge of the second carrier, and for the second carrier to protrude on the other side of the first carrier on one side relative to a side edge of the first carrier. A further possibility, moreover, is for the second carrier to consist of at least two carrier parts separate from one another, with the first carrier part having a first width and the second carrier part having a second width, the sum total of the widths of the carrier parts being less than the width of the first carrier.

In this case, a cable loom is wrapped with the above-described adhesive tape not in a helical line, as usual, but instead such that during wrapping, a longitudinal axis of the tape is aligned substantially parallel to the running direction of the cable loom. In this case, viewed in cross section, the adhesive tape is in the form of an Archimedean spiral around the cable loom. This mode of winding is referred to below as "wrapping of the cable loom". If used in the form of a helical line, it is possible for the adhesive to come into contact with the cable jacketing, leading again to the disadvantages outlined above.

Besides the conventional vehicles with internal combustion engines, importance is increasingly being gained by hybrid electric vehicles (HEVs), hybrid electric vehicles with an external charging option (plug-in hybrid electric vehicles, PHEVs) and electric cars with a battery (battery electric vehicles, BEVs). A hybrid electric vehicle is a vehicle with hybrid drive, namely an electrical vehicle which is driven by at least one electrical motor and also by a further energy converter and which draws energy both from its electrical store (battery) and from a fuel which is carried additionally. A fully electric vehicle is driven exclusively by a battery-operated electrical motor and so requires no fossil fuel. Across the various types of vehicle, the electrical store is designed with different storage capacities; the store can be charged via vehicle-internal energy recovery and/or via externally supplied electrical energy from charging posts, and/or via externally supplied electrical energy from inductive energy transfer.

For the storage of electrical energy, batteries with high operating voltage (high-voltage batteries) have become established, these batteries being operated with a direct voltage between 380 V and 600 V. For electrical supply from different direct-current or alternating-current sources and for the provision of energy for independent direct-current and alternating-current applications in the vehicle, integrated inverter units are required. The high hazard potential of such high-voltage systems requires, on the one hand, particular mechanical protection and the marking of these leads; on the other hand, the electromagnetic radiation given off by all of the high-voltage components used poses a particular challenge to the design and construction of these cable harnesses.

In all motor vehicles, the quantity of electrical leads is increasing as a result of increased use of electrical components, while at the same time the space for installation of the harness of leads, particularly in small motor vehicles, is becoming ever smaller. Especially the use of signal leads for very technically important components or else safety-relevant systems in the motor vehicle are increasing when the vehicles are redesigned. In such cases, damage or electromagnetic interference would lead to considerable disruption or damage. In the design and construction of electric and hybrid vehicles, particular attention is focused on mechanical and electromagnetic protection of the leads that are used.

Protection for cables which lead from the front of the vehicle, from the inverter, to the high-voltage battery positioned in the rear of the vehicle is described in JP 2016 046 901 A1 or U.S. Pat. No. 9,676,349 B2. A tube is proposed which is made of iron, aluminium, copper or stainless steel and which accommodates the feed cable for the high-voltage battery. This solution provides mechanical and electromagnetic protection of the lead, with distinct disadvantages in relation to the required installation space and the installation steps: each bend in the lead pathway must be planned for in construction and the corresponding tubular bends must be produced on machinery set up for that purpose.

DE 10 2018 000 140 A1 or WO 2019/138829 A1 likewise proposes a tube, which may be combined with metal braids. The leads obtain electromagnetic protection. This solution also uses heavy metallic materials, which can be installed in time-consuming and costly processes and which offer the desired protection.

With the need to save weight in the vehicle, WO 2015/049980 A1 shows a spiral wrap around the cables requiring protection. Here, in the first step, a resinous material is wound onto the cables, then covered spirally with a conductive metal foil and enveloped with a shrink-on hose for the purpose of moisture sealing. The spiral wrapping permits flexible design of the lead pathway; the metal foil produces the electromagnetic shielding; but the shrink-on hose requires the application of heat, which in certain cases may lead to adverse effects on the cables. The winding steps following one another are time-consuming in production, however.

EP 2 597 740 A1 provides an electromagnetic shielding where a sheetlike material is wound around the leads, with the conductive metal layer facing the cable bundle. In the case of lengthwise envelopment, a pennant is formed which is to be wrapped round and which assures electrical contact. A further envelope ensures the mechanical protection and the positioning of the pennant. Here again, however, such a solution entails time-consuming and costly working.

Another known system for protecting cables is a convoluted tube, for which plastic tubes are provided during their actual production with a convoluted structure so that different bending radii can be realized during installation. EP 2 847 838 A1 proposes one or more layers of conductive metal on the plastic surface. These layers are intended not to exhibit any cracks even on bending, so as to provide electromagnetic protection at any time. With a system of this kind, different diameters are retained and the cables must be threaded laboriously through the length of the tube. If the metallic layers are enclosed between the plastic layers, the issue of electrical contacting is not resolved.

It is an object of the invention to obtain a marked improvement relative to the prior art and to provide an adhesive tape which in the form of lengthwise bandaging provides particular protection to lead harnesses with respect to electromagnetic interference. This protective function is intended to protect in particular the high-voltage regions on the lead harness. The adhesive tape is intended to provide perfect realization of two contradictory properties: firstly, electromagnetic protection with respect to interference that occurs; secondly, the capacity to be wrapped flexibly on thin items in spite of the stiffness associated with the high mechanical protection, even where the weight is low.

This object is achieved by means of an adhesive tape as recorded in the main claim. The dependent claims provide advantageous developments of the adhesive tape, methods for using the adhesive tape, and a method for producing a shielded cable loom.

The invention relates accordingly to an adhesive tape, especially for lengthwise jacketing of elongate items such as cable harnesses in a motor vehicle, comprising a first carrier having a top side and a bottom side, where the first carrier, based on the cross direction, has a width $B_T$, and at least one layer of adhesive applied on the bottom side of the first carrier, where the adhesive layer bears a second carrier,
the first carrier with the adhesive layer protrudes at least on one long edge relative to a side edge of the second carrier, where the first protrusion has a width of $B_{start}$,
the first carrier is a woven fabric or a nonwoven fabric and
the second carrier is a metallic layer,
the first carrier has a basis weight of 50 g/m² to 600 g/m².

The adhesive tape of the invention preferably consists substantially of the three layers; further functional layers for optimizing the properties of the first or second carrier may be present on said first or second carrier. These layers are defined as a constituent of the respective layer.

In the first variant according to the invention, the first carrier is a woven fabric.

Particularly preferred woven fabrics are constructed such that
the warp thread count is 30 to 50/cm,
the weft thread count is 18 to 30/cm, the warp threads possess a yarn weight between 40 and 400 dtex, more particularly between 44 and 330 dtex, very preferably of 167 dtex, the weft threads possess a yarn weight between 40 and 660 dtex, more particularly between 44 and 400 dtex, very preferably of 167 dtex.

The basis weight of the carrier is more preferably 60 to 400 g/m².

In a further advantageous embodiment of the invention, the warp thread count is 40 to 50/cm, preferably 44/cm.

In a further advantageous embodiment of the invention, the weft thread count is 20 to 30/cm, preferably 26 to 29/cm.

In a further advantageous embodiment of the invention, the woven fabric is a woven polyester fabric, more particularly a woven polyethylene terephthalate fabric. Further possible variants include woven polyamide fabrics or woven polyester and polyamide blend fabrics.

More preferably the thickness of the woven fabric is not more than 300 µm, more preferably 170 to 230 µm, very preferably 190 to 210 µm.

In another advantageous embodiment of the invention, the first carrier has a basis weight of 70 g/m² to 200 g/m², preferably 100 to 150 g/m².

The woven fabric may take the form of a plain weave, twill weave or satin weave, and also in the form of ripstop. Ripstop is a term for fabrics which are woven using specific technology and have particular tear strength. At intervals of normally 5 to 8 millimetres, thicker threads are integrated into the otherwise thinner fabric. This gives the fabric a more or less distinct "chequerboard" structure.

The first layer may be a woven fabric, if mechanical protection is desired in particular.

If the emphasis is more on damping properties, the first carrier selected, in the second variant according to the invention, is a nonwoven web, the term "nonwoven web" referring at least to sheetlike textile structures according to EN 29092 (1988) and also to stitchbonded webs and similar systems.

Particularly suitable in principle are the nonwoven webs having the same dimensional stability as thin metal foils.

Particular preference is given in this context to spunbonded webs.

Particularly suitable nonwoven fabrics are consolidated staple fibre webs, but also filament webs, melt blown webs and spunbonded webs, which usually require additional consolidation. Possible methods of consolidation known for webs are mechanical, thermal and chemical consolidation. While with mechanical consolidation the fibres are usually held together purely mechanically, by swirling of the individual fibres, by interlooping of fibre bundles or by the stitching-in of additional threads, it is possible to achieve fibre-fibre bonds by thermal methods and also by chemical methods, these fibre-fibre bonds being adhesive (with binder) or cohesive (binder-free). Given appropriate formulation and an appropriate process regime, these fibre-fibre bonds may be limited exclusively or at least predominantly to fibre nodal points, with the consequent formation of a stable, three-dimensional network in spite of the relatively loose, open structure obtained in the web. Having proven to be particularly advantageous are webs consolidated in particular by overstitching with separate threads or by interlooping.

Consolidated webs of these kinds are produced for example on stitchbonding machines of the "Malimo" type from Karl Mayer, formerly Malimo, and can be obtained from suppliers including Hoftex Group AG. A Malivlies is characterized by the consolidation of a cross-laid fibre web through the formation of meshes from fibres of the web.

The carrier used may also be a Kunit or Multiknit web. A Kunit web is characterized in that it originates from the processing of a longitudinally oriented fibre web to form a sheetlike structure which has loops on one side and, on the other side, loop feet or pile fibre folds, but possesses neither other threads nor prefabricated sheetlike structures. A nonwoven web of this kind as well has already been produced for some considerable time, for example, on stitchbonding machines of the "Malimo" type from Karl Mayer. Another characterizing feature of this web is that as a longitudinal fibre web it is able to accommodate high tensile forces in the lengthwise direction. A Multiknit web is characterized relative to the Kunit web in that the web experiences consolidation on both the top and bottom sides by virtue of the double-sided needle punching. Serving in general as a starting product for a Multiknit are one or two single-sidedly interlooped pile fibre stitchbonded fabrics produced by the Kunit process. In the end product, the two top sides of the fabric are shaped by fibre interlooping to form a closed surface, and are joined to one another by fibres which stand almost perpendicular. It is possible additionally to incorporate further punchable sheetlike structures and/or scatterable media.

Also suitable, lastly, are stitchbonded nonwovens as a precursor to the formation of a carrier of the invention and an adhesive tape of the invention. A stitchbonded nonwoven is formed from a nonwoven web material having a large number of mutually parallel seams. These seams are formed by the stitched or knitted incorporation of continuous textile threads. For this type of nonwoven web, stitchbonding machines of the "Maliwatt" type from Karl Mayer, formerly Malimo, are known.

Also particularly suitable are needlefelt webs. In a needlefelt web, a fibre web is converted into a sheetlike structure by means of barbed needles. The needles are punched into and pulled out of the material in alternation in order to consolidate it on a needle beam, with the individual fibres becoming entangled to form a firm sheetlike structure. The number and embodiment of the needling points (needle shape, penetration depth, double-sided needling) determine the thickness and strength of the fibre structures, which in general are lightweight, air-permeable and elastic.

Also particularly advantageous is a staple fibre web, which in a first step is preconsolidated by mechanical working or which is a wet-laid web laid hydrodynamically, where between 2 wt % and 50 wt % of the fibres of the web are fusible fibres, more particularly between 5 wt % and 40 wt % of the fibres of the web.

A web of this kind is characterized in that the fibres are laid wet or, for example, a staple fibre web is preconsolidated by the formation of loops from fibres of the web, by needling, stitching, air and/or waterjet processing.

A second step is that of heatsetting, where the strength of the web is increased further by the complete or partial melting of the fusible fibres.

For the utilization of nonwovens in the invention, the adhesive consolidation of mechanically preconsolidated or wet-laid webs is of particular interest, it being possible for said consolidation to take place via addition of binder in solid, liquid, foamed or pastelike form. A great diversity of theoretical presentation forms is possible: for example, solid binders as powder for trickling in; as a sheet or as a mesh; or in the form of binding fibres. Liquid binders can be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC and the like, and also copolymers thereof. Normally the dispersions are anionically or nonionically stabilized, although in certain cases cationic dispersions may also be of advantage.

The binder may be applied in a way which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For sufficient adhesive consolidation of the web carrier, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. After the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of full-surface or partial application of pressure. The binder may be activated in known drying tunnels, given an appropriate selection of binder, or else by means of infrared radiation, UV radiation, ultrasound, high-frequency radiation, or the like. For the subsequent end use it is sensible, but not absolutely necessary, for the binder to have lost its tack following the end of the web production process. In no case is the (residual) tack high enough to allow the web to function itself as an adhesive tape.

In the case of a spunbond (spunbonded web), continuous fibres (filaments) are initially spun from a melt or solution. In the case of thermoplastic raw materials, this takes place directly by a melt spinning process (spunmelt). For that process a pelletized polymer is melted and fed to a spinneret. The emerging threads (filaments) are drawn off directly by aerodynamic or mechanical means, in the course of which they are stretched. The filaments are thereafter deposited in circular sheets, producing properties possessing multi-directional uniformity. These are, in the narrower sense, the meltspun webs.

Where the filaments are broken up while still in liquid form by a stream of hot air, fine individual fibres are produced in what is called a meltblowing process (meltblown). The fibres thus generated and deposited on a cooling belt produce microfiber webs. Production often takes place with multiple plies, or the webs are produced directly as laminates with other webs of material (for example, SMS=spunbond-meltblown-spunbond).

Not only thermoplastics but also thermoelastic materials can be processed. Combination is possible with various aftertreatments, such as embossing and thermal bonding processes, for example.

Also deserving of mention is the electrostatic spunbond web process. In this case, melted fibres are sprayed in an electrostatic field.

The basis weight of the textile carrier is advantageously between 60 g/m$^2$ and 200 g/m$^2$, more advantageously between 70 g/m$^2$ and 110 g/m$^2$, and/or the thickness is advantageously between 150 to 800 µm, more advantageously between 200 to 350 µm.

Starting materials for the woven fabric and the nonwoven fabric of the first carrier and for the textile of the second carrier, where used, are more particularly (manmade) fibres (staple fibre or continuous filament) made from synthetic polymers, also called synthetic fibres, of polyester such as polyethylene terephthalate, polyamide, polyimide or aramid, or blends of the stated fibres.

Furthermore, yarns manufactured from the specified fibres are likewise suitable. In the case of woven fabrics, it is possible to use individual threads made from a blended yarn. Generally speaking, the warp threads and the weft threads are each made of a single type, however.

The yarns or threads of the woven fabrics may take the form of filaments. For the purposes of this invention, a filament refers to a bundle of parallel, individual linear fibres/filaments, often also referred to in the literature as a multifilament. This fibre bundle may optionally be given inherent strengthening by torsion, and is then referred to as spun or folded filaments. The fibre bundle may alternatively be given inherent strengthening by entangling using compressed air or water jets. In the text below, for all of these embodiments, only the term "filament" is used, in a generalizing way.

The filament may be textured or smooth and may have point strengthening or no strengthening.

Texturing refers generally to an operation in which the threads undergo permanent crimping. The crimping produces loops which increase the elastic stretchability and also the abrasion resistance.

Particularly if the yarns used consist of mutually parallel filaments spun from spinnerets, these yarns in accordance with the invention are preferably twisted, and more preferably may be intermingled as well prior to twisting. Twisting provides them, on folding machines used typically for folding two or more yarns in the textile industry, with a twist, meaning that they are passed around one another—or the yarn assembly is turned about its own axis—to give them a greater cohesion. In this case a stable, circular yarn element is formed. A distinction is made here according to the direction of rotation, as for twisted staple fibres, according to DIN 60 900-4 (1988-07), between S (right-handed twist) and Z (left-handed twist), according to whether the individual filaments extend parallel in the form of an S or Z when the thread is left to hang vertically.

The twist imparted is stated as the number of turns of the thread per m (T/m). On twisting, the filaments may in particular have a number of turns, based on one meter of length (T/m), in the range from 10 to 400; with particular preference the filaments have a number of turns, based on one meter of length (T/m), in the range from 140 to 260.

Preferred material used comprises polyamide, more preferably polyester such as polyethylene terephthalate, on account of the outstanding ageing stability and the outstanding media resistance with respect to chemicals and service media such as oil, petrol, antifreeze and the like. Polyester, moreover, has the advantages that it leads to a very abrasion-resistant and temperature-stable carrier, this being particularly important for the specific end use for the bundling of cables in motor vehicles and, for example, in the engine compartment.

Advantageously and at least regionally the first carrier has a single-sidedly or double-sidedly polished surface, preferably in each case a fully polished surface. The polished surface may be chintzed, as explained in EP 1 448 744 A1, for example. This enhances the dirt repellency.

The first carrier, the top side of which can be seen after wrapping, may have a coloration in order to identify the adhesive tape:
- orange for voltages>60 volts,
- blue for voltages>48 volts and
- other colours if determined by statutory provisions.

The first carrier provides mechanical protection on the outer ply of the sheathing solution; in this case, additionally, the adhesive tape sheath can be deployed flexibly on the cable harness to allow shaping for any installation scenario.

The adhesively furnished woven fabric or nonwoven fabric carrier supports the second carrier and provides the secure surrounding and the durably adhesive closure of the resultant longitudinal bandaging, also called surround.

The adhesive coatweight, based on the surface area of carrier, is preferably between 40 and 160 g/m$^2$, more preferably between 60 and 130 g/m$^2$, more preferably still between 80 and 100 g/m$^2$.

The second carrier is a metallic layer designed so as to be conductive in cross and machine directions in order to attenuate electromagnetic interferences and ideally to eliminate them to a very large extent.

The direction of the flow of material in the machine in which a woven or nonwoven fabric or a fabric more generally is produced is referred to as the machine direction or running direction (lengthwise direction), the direction at right angles thereto being referred to correspondingly as the cross direction.

As a metallic layer it is possible in the invention to employ metal foils, layer laminates in which at least one layer is conductive, or metallized textile carriers, and also carriers, especially textile carriers, that are coated with a metallic layer.

Metals selected for the metal foil may be silver, copper, gold, platinum, aluminium and compounds of aluminium, tin, nichrome, NIROSTA, titanium, metal oxides such as tin oxides, zinc oxides, magnesium oxides, preferably aluminium. This recitation should not be considered here to be exhaustive; instead, the skilled person is able to select further metal layers, not explicitly stated here, without departing from the concept of the invention. An antioxidative layer on the metallic layer, countering corrosion, may be advantageous, as it extends the life of the metallic layer.

The term "textile carrier" or "sheetlike textile structure" encompasses wovens, formed-loop knits, drawn-loop knits, laid scrims, tapes, braids, spacer knits, stitchbonded webs, tufted textiles and felts, which are produced in part from yarns, and also non-woven fibre webs or fibre nonwovens.

Suitable fibre materials include in principle all fibre materials that are typically used for producing textiles. These include cotton, wool, hemp fibre, sisal fibres, flax, ramie, polyacrylonitrile, polyester fibres, polyamide fibres, viscose, silk, acetate fibres, triacetate fibres, aramid fibres and the like.

Preference is given to using polyamide fibres, more preferably polyester fibres such as polyethylene terephthalate fibres. Likewise suitable, furthermore, are yarns made from the stated fibres, and also the yarns described above.

For illustration, the following metallic layers may be stated:
- Aluminium foil, especially with a thickness of 15 to 100 µm
- Copper foil, especially with a thickness of 10 to 80 µm
- Stainless steel foil, especially with a thickness of 10 to 60 µm
- Layer laminates composed of a polymeric film having a thickness of between 20 and 50 µm, more particularly 36 µm, and of a metallic surface having a thickness of between 15 and 25 µm, more particularly 20 µm
- Layer laminates composed of a paper and metallic surface
- Metallized wovens or nonwovens The metallic films may also be embossed, in spherical nub form, for example, and so provide a surface area which is increased by comparison with the surround.

Based on the width $B_{Protect}$ of the second layer, two variants of the adhesive tape are in accordance with the invention.

In the case of the first variant, the width $B_{Protect}$ of the second carrier in the form of the metallic layer on the adhesive layer is selected such that the width $B_{Protect}$ is less than the width $B_T$ of the first carrier, specifically such that the first carrier, with the adhesive layer applied preferably over the full area, protrudes on both sides relative to the side edges of the second carrier, thus forming a second protrusion having a width $B_{Wrap}$.

In the case of the second variant, the width $B_{Protect}$ of the second carrier, in the form of the metallic layer on the adhesive layer applied preferably over the full area, is selected such that the second carrier protrudes with the adhesive layer relative to the second side edge of the first carrier, to form a second protrusion having a width $B_{Flag}$.

The width $B_{Protect}$ may be selected to be the same as the width $B_T$ of the first carrier, in which case the width $B_{start}$ of the first protrusion is the same as the width $B_{Flag}$ of the second protrusion.

The width $B_{Protect}$ of the second carrier may alternatively be selected to be (slightly) less than the width $B_T$ of the first carrier, or more. In these cases, the width $B_{start}$ of the first protrusion is different from the width $B_{Flag}$ of the second protrusion.

For the individual sections, the following widths have proven to be particularly advantageous:
- $B_{start}$ has a width of 3 to 20 mm, preferably 5 to 10 mm.
- $B_{Protect}$ has a width of 50 to 200 mm, preferably 80 to 160 mm, or a width of 100 to 400 mm, preferably 160 to 320 mm, if the item is to be wrapped with two plies.
- $B_{Wrap}$ has a width of 50 to 200 mm, preferably 80 to 160 mm.
- $B_{Flag}$ has a width of 50 to 200 mm, preferably 80 to 160 mm.

The widths of the individual sections are selected in principle such that the adhesive tape can be used very effectively.

During the jacketing operation, the section $B_{start}$ serves to secure the adhesive tape gently on the item, so that there is no slippage during the ongoing wrapping operation.

The section $B_{Protect}$ envelops the item to be wrapped, i.e. usually the cable loom, the cable looms wrapped being those having diameters of 10 mm up to 40 or 50 mm. The width is guided in particular as well by the consideration of whether the item is to be wrapped in one or two plies by the second carrier.

The section $B_{Wrap}$ serves to secure the adhesive tape reliably. In order to ensure reliable securement, it may be advantageous if the width of this section is such that the entire item is wrapped completely one further time.

With further preference the metallic layer features electrical contacting to a conductor.

The electrical contacting of the metallic layer is necessary if the induced current has to be conducted away. A shield current can be conducted away reliably if there is contacting at both ends of the lead harness.

The electrical contacting may be achieved, for example, by enveloping the cable loom with the adhesive tape in such a way that the electrically conducting plugs at both ends of the lead harness make electrically conductive contact with the metallic layer. In that case the shield current is conducted away via the plugs.

Another way of ensuring conduction over the length of the lead harness is to insert an uninsulated lead (drain wire) between the metallic layer and cable loom, and then to connect this wire to a plug, with consequent conduction of current away by way of this plug contact.

The wrapping may be applied with an electrically conducting ring closure, with the electrically conducting layer being applied to the cable in such a way that an electrically conducting connection is formed in the direction of the cable periphery. This form of wrapping generates a positive effect particularly in the case of high-frequency signals, and reduces the inductance and the electromagnetic compatibility in the high-frequency transfer region.

For the adhesive on the first carrier it is possible to employ all known adhesive systems. Besides adhesives based on natural or synthetic rubber, it is possible in particular to use silicone adhesives and also polyacrylate adhesives.

If there are further layers of adhesive on the exposed surfaces of the first or second carrier, they may also be selected from the adhesives below.

The adhesive is preferably a pressure-sensitive adhesive (PSA), in other words an adhesive which even under relatively weak applied pressure allows durable bonding to virtually all substrates and which after use can be detached from the substrate again substantially without residue. A PSA has a permanently pressure-sensitive adhesive effect at room temperature, in other words possessing sufficiently low viscosity and a high tack, and so the surface of the bonding substrate in question is wetted even with low applied pressure. The bondability of the adhesive derives from its adhesive properties, and the redetachability from its cohesive properties.

PSAs may be viewed as liquids of extremely high viscosity with an elastic component. PSAs accordingly have particular, characteristic viscoelastic properties which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, in dependence not only on the precise composition, the structure and the degree of crosslinking of the respective PSA, but also on the rate and duration of the deformation, and on the temperature.

The proportional viscous flow is necessary for the attainment of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel adhesion. Highly crosslinked systems, crystalline polymers or polymers with glasslike solidification lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. They enable an adhesive bond to withstand a long-term load acting on it, in the form of a long-term shearing load, for example, to a sufficient extent over a relatively long time period.

Particularly preferred is a PSA in the form of a dried polymer dispersion, the polymer having been synthesized from:
(a) 95.0 to 100.0 wt % of n-butyl acrylate and/or 2-ethylhexyl acrylate
(b) 0.0 to 5.0 wt % of an ethylenically unsaturated monomer having an acid or acid anhydride function.

The polymer consists preferably of 95.0 to 99.5 wt % of n-butyl acrylate and/or 2-ethylhexyl acrylate and 0.5 to 5 wt % of an ethylenically unsaturated monomer having an acid or acid anhydride function, more preferably of 97.0 or 98.0 wt % to 99.0 wt % of n-butyl acrylate and/or 2-ethylhexyl acrylate and 1.0 to 2.0 wt % or 3 wt % of an ethylenically unsaturated monomer having an acid or acid anhydride function.

Besides the acrylate polymers recited, and besides any residual monomers present, the PSA may additionally be admixed with tackifiers and/or adjuvants such as light stabilizers or ageing inhibitors.

In particular there are no further polymers such as elastomers present in the PSA, meaning that the polymers of the PSA consist only of the monomers (a) and (b) in the proportions indicated.

The monomer (a) is preferably formed by n-butyl acrylate.

Examples of monomers contemplated as (b) advantageously include acrylic acid, methacrylic acid, itaconic acid, maleic acid, fumaric acid and/or maleic anhydride.

Preference is given to (meth)acrylic acid of the formula I,

(I)

where $R^3$ is H or $CH_3$; preference is given optionally to using the mixture of acrylic acid or methacrylic acid. Acrylic acid is particularly preferred.

According to one particularly preferred variant, the composition of the polymer is as follows:
(a) 95.0 to 100.0 wt %, preferably 95.0 to 99.5 wt %, more preferably 98.0 to 99.0 wt % of n-butyl acrylate and
(b) 0.0 to 5.0 wt %, preferably 0.5 to 5.0 wt %, more preferably 1.0 to 2.0 wt % of acrylic acid.

The polymer dispersion is prepared by the process of emulsion polymerization of the stated components. Descriptions of this process can be found for example in "Emulsion Polymerization and Emulsion Polymers" by Peter A. Lovell and Mohamed S. El-Aasser—Wiley-VCH 1997—ISBN 0-471-96746-7 or in EP 1 378 527 B1.

During the polymerization it cannot be ruled out that not all of the monomers undergo reaction to form polymers. It is obvious here that the residual monomer content is to be as small as possible.

Preference is given to providing adhesives comprising the polymer dispersion with a residual monomer content of less than or equal to 1 wt %, more particularly less than or equal to 0.5 wt % (based on the mass of the dried polymer dispersion).

A "tackifier resin" is understood, in accordance with the general understanding of the skilled person, to refer to an oligomeric or polymeric resin which raises the autoadhesion (the tack, the inherent adhesiveness) of the PSA by comparison with the PSA that is otherwise identical but contains no tackifier resin.

The use of tackifiers for boosting the peel adhesion values of PSAs is known in principle. This effect also comes about if the adhesive is admixed with up to 15 parts by weight (corresponding to <15 parts by weight), or 5 to 15 parts by weight, of tackifier (based on the mass of the dried polymer dispersion). Preference is given to adding 5 to 12, more preferably 6 to 10, parts by weight of tackifier (based on the mass of the dried polymer dispersion).

Suitability as tackifiers, also referred to as tackifier resins, is possessed in principle by all known classes of compound. Tackifiers are, for example, hydrocarbon resins (for example polymers based on unsaturated $C_5$ or $C_9$ monomers), terpene-phenolic resins, polyterpene resins based on raw materials such as, for example, α- or β-pinene, aromatic resins such as coumarone-indene resins or resins based on styrene or α-methylstyrene such as rosin and its derivatives, for example disproportionated, dimerized or esterified rosin, for example reaction products with glycol, glycerol or pentaerythritol, to name but a few. Preferred resins are those without readily oxidizable double bonds, such as terpene-phenolic resins, aromatic resins and, very preferably, resins produced by hydrogenation, such as, for example, hydrogenated aromatic resins, hydrogenated polycyclopentadiene resins, hydrogenated rosin derivatives or hydrogenated polyterpene resins.

Resins based on terpene phenols and rosin esters are preferred. Likewise preferred are tackifier resins having a softening point of more than 80° C. according to ASTM E28-99 (2009). Particularly preferred are resins based on terpene phenols and rosin esters having a softening point of more than 90° C. according to ASTM E28-99 (2009). The resins are usefully employed in dispersion form. In that way they can easily be mixed in finely divided form with the polymer dispersion.

Particularly preferred is the variant wherein no tackifier resins at all have been added to the PSA.

In particular, the PSA is not admixed with the following substances:
  hydrocarbon resins (for example polymers based on unsaturated $C_5$ or $C_9$ monomers)
  terpene-phenolic resins
  polyterpene resins based on raw materials such as, for example, α- or β-pinene
  aromatic resins such as coumarone-indene resins or resins based on styrene or α-methylstyrene such as rosin and its derivatives, for example disproportionated, dimerized or esterified rosin, for example reaction products with glycol, glycerol or pentaerythritol.

On account of their particular suitability as an adhesive for adhesive tapes of automotive cable harnesses, in respect of freedom from fogging, preference is given to solvent-free acrylate hotmelt compounds, of the kind described in more detail in DE 198 07 752 A1 and also in DE 100 11 788 A1.

A suitable adhesive is an acrylate hotmelt-based adhesive having a K value of at least 20, more particularly greater than 30 (measured in each case in 1 wt % solution in toluene, 25° C.) and obtainable by concentrating a solution of such an adhesive to form a system which can be processed as a hotmelt.

The concentrating process may take place in appropriately equipped vessels or extruders; especially in the case of accompanying degassing, a venting extruder is preferred.

One such adhesive is set out in DE 43 13 008 C2. In an intermediate step, the solvent is removed entirely from these acrylate adhesives produced in this way.

The K value here is determined in particular in analogy to DIN 53 726.

Additionally here, further volatile constituents are removed. After coating from the melt, these adhesives have only small fractions of volatile constituents. Hence it is possible to adopt all of the monomers/formulas that are claimed in the patent referred to above.

The solution of the adhesive may comprise 5 to 80 wt %, more particularly 30 to 70 wt %, of solvents.

Preference is given to using commercial solvents, particularly low-boiling hydrocarbons, ketones, alcohols and/or esters.

It is preferred, moreover, to use single-screw, twin-screw or multi-screw extruders having one or, in particular, two or more venting units.

The acrylate hotmelt-based adhesive may have had benzoin derivatives incorporated into it by copolymerization, examples being benzoin acrylate or benzoin methacrylate, acrylic or methacrylic esters. Benzoin derivatives of these kinds are described in EP 0 578 151 A.

The acrylate hotmelt-based adhesive may be UV-crosslinked. Other modes of crosslinking are also possible, however, an example being electron beam crosslinking.

In another preferred embodiment, self-adhesive compounds used are copolymers of (meth)acrylic acid and esters thereof having 1 to 25 carbon atoms, maleic, fumaric and/or itaconic acid and/or their esters, substituted (meth)acrylamides, maleic anhydride, and other vinyl compounds, such as vinyl esters, more particularly vinyl acetate, vinyl alcohols and/or vinyl ethers.

The residual solvent content ought to be below 1 wt %.

One adhesive which is found to be particularly suitable is a low molecular mass, pressure-sensitive, acrylate hotmelt adhesive, of the kind stocked under the name acResin UV or Acronal®, especially acResin A 260UV, by BASF. This adhesive with a low K value acquires its practical properties as a result of a concluding crosslinking procedure initiated chemically by radiation.

Other outstandingly suitable adhesives are described in EP 3 540 024 A1, EP 2 520 627 A1, EP 2 522 705 A1, EP 2 520 628 A1, EP 2 695 926 A1 and EP 2 520 629 A1.

The adhesive coating likewise preferably consists of an adhesive based on synthetic rubber, more particularly, in fact, an adhesive comprising at least one vinyl aromatic block copolymer and at least one tackifying resin. Typical concentrations of use for the block copolymer lie in a concentration in the range between 30 wt % and 70 wt %, more particularly in the range between 35 wt % and 55 wt %.

Further polymers which may be present are those based on pure hydrocarbons such as, for example, unsaturated polydienes, such as natural or synthetically produced polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing or vinyl ether-containing polyolefins, which may replace up to half of the vinyl aromatic-containing block copolymers.

Serving as tackifiers are tackifier resins which are compatible with the elastomer block of the styrene block copolymers.

Plasticizing agents typically employed are those such as, for example, liquid resins, plasticizer oils or low molecular mass liquid polymers such as, for example, low molecular mass polyisobutylenes having molar masses<1500 g/mol (number average) or liquid EPDM grades.

To all the stated types of adhesives it is possible to add further additives in the form of light stabilizers such as, for example, UV absorbers, sterically hindered amines, antiozonants, metal deactivators, processing assistants, and end-block-reinforcing resins.

Fillers such as, for example, silicon dioxide, glass (ground or in the form of spheres, as solid or hollow spheres), microballoons, aluminium oxides, zinc oxides, calcium carbonates, titanium dioxides, carbon blacks, silicates and chalk, to name but a few, and also colour pigments and dyes, and optical brighteners as well, may likewise be used.

It is common to add primary and secondary antioxidants to PSAs in order to improve their ageing stability. Primary antioxidants react with oxy and peroxy radicals, which may form in the presence of oxygen, and react with them to form less reactive compounds. Secondary antioxidants reduce hydroperoxides, for example, into alcohols. There is a known synergistic effect between primary and secondary ageing inhibitors, and so the protective effect of a mixture is frequently greater than the sum of the two individual effects.

If the adhesive tape described is to be of low flammability, this quality can be achieved by adding flame retardants to the carrier and/or to the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The PSAs may be produced and processed from solution, from dispersion and also from the melt. Preferred production and processing methods take place from the melt. For the latter case, suitable production operations encompass both batch processes and continuous processes.

The adhesive may be applied in the longitudinal direction of the adhesive tape, in the form of a stripe, the width of the stripe being lower than that of the first carrier.

Depending on the particular utility, there may also be a plurality of parallel stripes of the adhesive coated on the carrier material.

The position of the stripe on the carrier is freely selectable, with preference being given to an arrangement directly at one of the edges of the carrier.

The adhesive is preferably applied over the full area on the first carrier.

Specifically if there are further layers of adhesive on the exposed surfaces of the first or second carrier, they are preferably applied partially in stripe form.

The general expression "adhesive tape" in the context of this invention encompasses all sheetlike structures such as two-dimensionally extended films or film sections, tapes with extended length and limited width, tape sections and the like, and also, lastly, diecuts or labels.

The adhesive tape therefore has a longitudinal extent and a latitudinal extent. The adhesive tape also has a thickness, extending perpendicularly to both extents, with the latitudinal extent and longitudinal extent being multiple times greater than the thickness. The thickness is very largely the same, preferably exactly the same, over the entire superficial extent of the adhesive tape as defined by length and width.

The adhesive tape takes the form in particular of a sheet web. A sheet web is an object whose length is multiple times greater than the width, with the width being approximately and preferably exactly the same along the entire length.

The adhesive tape may be produced in the form of a roll, in other words rolled up onto itself in the form of an Archimedean spiral.

Applied to the exposed top side of the first carrier may be a reverse-face varnish (functional layer), in order to exert a favourable influence on the unwind properties of the adhesive tape wound into the Archimedean spiral. This reverse-face varnish may for this purpose comprise silicone compounds or fluorosilicone compounds and also polyvinylstearylcarbamate, polyethyleniminestearylcarbamide or organofluorine compounds as adhesive substances.

The wrapping of a cable loom with the adhesive tape described takes place in this case such that, during wrapping, a longitudinal axis of the tape is oriented substantially parallel to the direction in which the cable loom extends. As viewed in cross section, the adhesive tape here is in the form of an Archimedean spiral around the cable loom (also familiar to those in the art as "cigar wrapping").

Likewise embraced by the concept of the invention is a jacketed elongate item, such as, in particular, a cable harness, jacketed with an adhesive tape of the invention, and also a vehicle comprising an elongate item thus jacketed.

In comparison to hoses and self-closing braided hoses which can be opened in the longitudinal direction, the longitudinal bandaging produced from the adhesive tape of the invention can be applied very easily around oval and flat forms of construction.

In order to ensure the proper application of the adhesive tape particularly on cable looms, there may be at least one marker line extending in the longitudinal direction on the top side of the first carrier. Two marker lines are preferred. These marker lines differ visually and/or haptically from the surface surrounding them.

The second carrier is intended to protect the entire periphery of the lead harness, but is not visible during wrapping, since the first carrier lies on the outside of the adhesive tape. A first marker line indicates the start of the second carrier. After the enveloping of the lead harness, the end of the second carrier is to extend over the first marker line (start), to allow an all-round protective layer to be produced.

The position of the second marker line (end) is adapted to the width of the second carrier. If the second carrier is to produce a complete envelopment, the stripe should be positioned near to the side edge of the second carrier. If the second marker line (end) is no longer visible after wrapping, sufficient envelopment for the lead harness diameter has been applied. If a lead harness with a large diameter is wrapped with the adhesive tape, the marker line (end) remains externally visible. If a lead harness of relatively small diameter is wrapped with the adhesive tape, the marker line (end) is not visible, but more adhesive tape has been used for wrapping than is arithmetically necessary. Protection is ensured.

The marking is applied to the carrier, by printing, for example. Alternatively or additionally, however, it is possible for the marking to be incorporated in the first carrier. For instance, the marking may be realized as a warp thread incorporated by weaving, so to speak.

EP 3 245 265 A1 describes the use of a marker line of this kind on an adhesive tape.

According to one preferred embodiment of the invention, therefore, there is at least one marker line extending in the longitudinal direction on the top side of the first carrier;

preferably there are two marker lines, which in particular are arranged above the long edges of the second carrier.

In order to enable particularly simple operation for the user, there are perforations in the adhesive tape, in particular aligned at right angles to the running direction of the adhesive tape and/or arranged at regular intervals.

This perforation serves primarily as a tearing aid for removal to the specified length. No perforations should be present in the section of adhesive tape jacketing the item, so as not to have any adverse effects on the shielding properties.

The perforations can be produced in a particularly advantageous way either discontinuously, using flat dies or cross-running perforating wheels, or continuously, using rotary systems such as spike rollers or punch rollers, optionally with the use of a counter-roller (Vulkollan roller) forming the counter-wheel during cutting.

Further possibilities include cutting technologies which are controlled to operate intermittently, such as the use of lasers, ultrasound or high-pressure waterjets, for example, and so on. Where, in the case of laser cutting or ultrasound cutting, some of the energy is introduced into the carrier material in the form of heat, it is possible to melt the fibres in the cutting region, thereby very largely preventing disruptive fraying, and producing sharply contoured cut edges. Latter methods are also suitable for obtaining specific cut-edge geometries, such as concave or convex cut edges, for example.

The adhesive tape can be employed flexibly on different cable diameters.

The proper application of the adhesive tape can be verified simply and reliably by means of the advantageous marking.

The adhesive tape of the invention may be applied in the customary and known operations in the context of cable bandaging.

The adhesive tape, in the form of the combination of woven fabric and a metallic layer, may be wound around the lead harness in various forms, and can to a small extent be deformed in the installation scenario. The surround solution comprising woven fabric and metal film is stable and can be employed without damage on the lead harness, surprisingly. The surround is vibration-resistant in driving operation of the vehicle, and does not exhibit any alterations due to changes in ambient temperature. Textured, increased metallic surface areas increase the shielding effect.

Longitudinal bandaging is more effective than spiral wrapping. The reason, surprisingly and unforeseeably in this way for the skilled person, is that longitudinal bandaging achieves shielding rates of the kind known for a braided shield.

As a flexible surround, the adhesive tape is able to wrap two or more leads at the same time and to conform to the shape of the cable bundle in the installation scenario.

Where a multiplicity of cables are used in a small installation space, external influences may result in the incoupling of common-mode signals, possibly leading to unwanted perturbances. The use of different voltages in electrically driven vehicles, in particular, may lead to these effects. In spite of the use of braided shielding, this incoupling of common-mode signals cannot be controlled in every installation scenario. The unified shielding of cables with adhesive tape in an installation scenario of this kind may lead to an attenuation of 20 to 30 dB(A) and can minimize a perturbance to sufficiently good effect.

BRIEF DESCRIPTION OF THE DRAWINGS

The intention of the text below is to illustrate the invention in more detail with reference to a number of figures, without thereby wishing to restrict the invention unnecessarily.

FIGS. 2a, 2b and 2c show vehicles with different drive concepts. The individual components within the vehicle are connected by cables.

FIG. 2a shows a hybrid vehicle 201, HEV, FIG. 2b a plug-in hybrid 201, PHEV.

Figure 1:
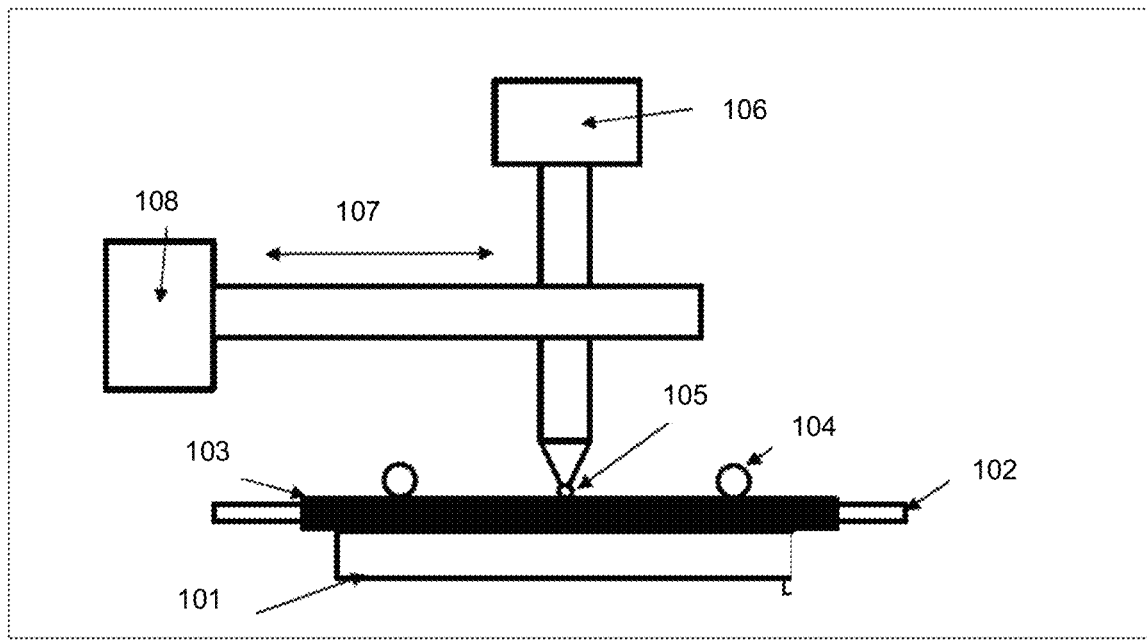
FIG. 1 shows the method of abrasion measurement (detailed explanations are given below)

Both concepts have a high-voltage battery 204, from which the current is passed via a high-voltage lead harness to an inverter 203 and then further via a motor lead harness 205 to the electric motor 202. The high-voltage lead harness 206 is jacketed with the adhesive tape of the invention.

Figure 2A:
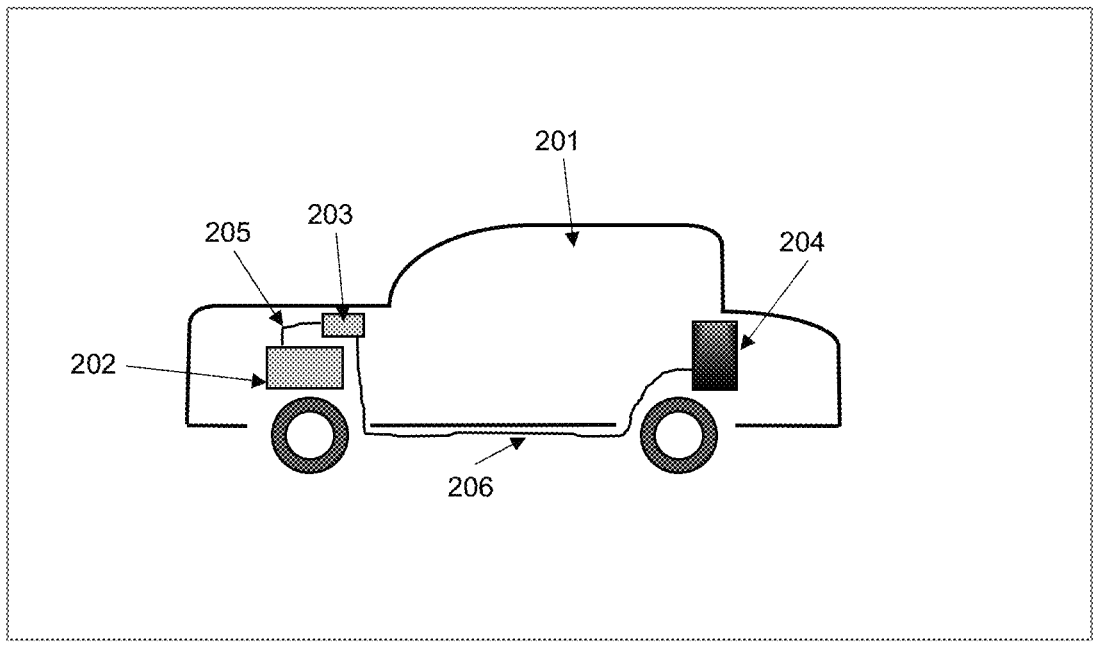
FIGS. 2a, 2b and 2c show variants of cars with hybrid or electric drive, featuring a cable harness jacketed with the adhesive tape of the invention.
Figure 2B:
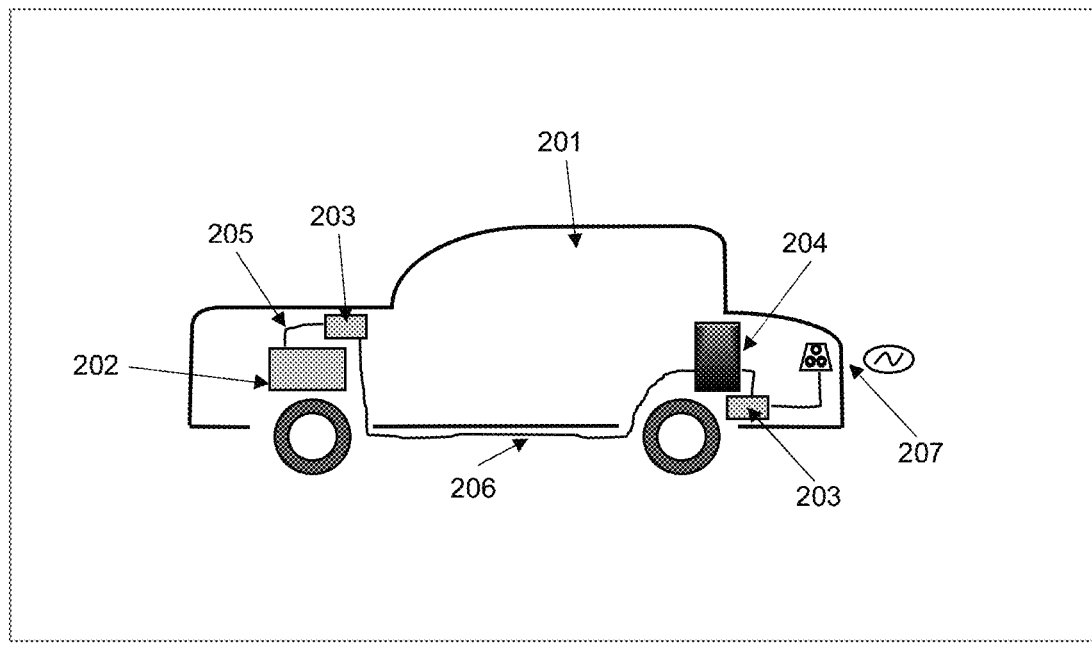
Figure 2C:
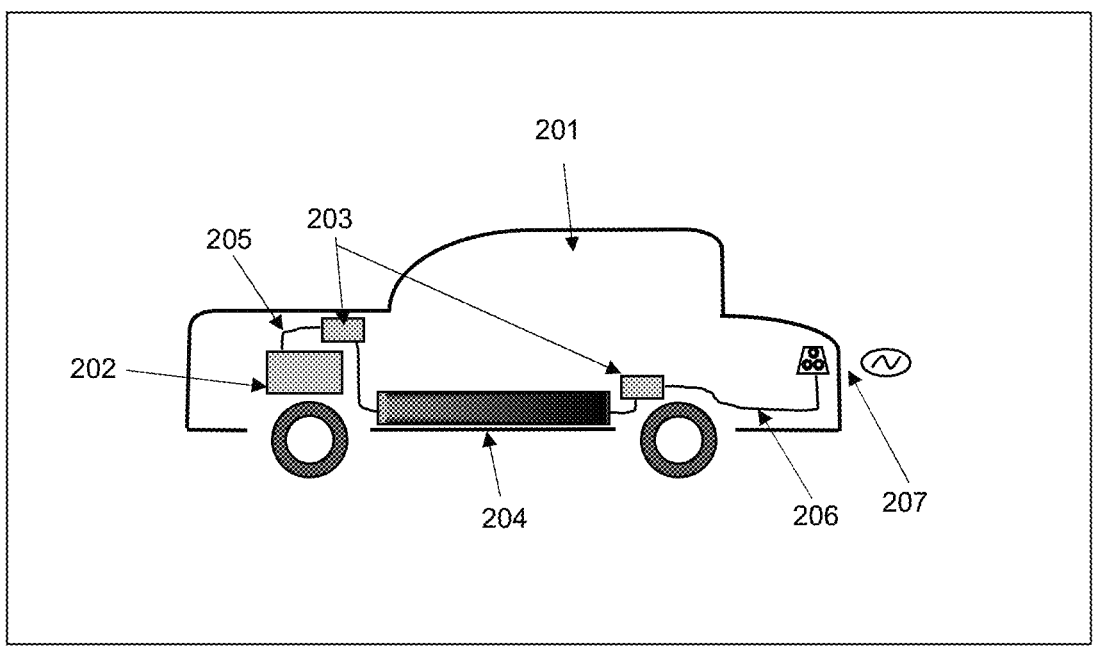

In contrast to the HEV, the PHEV additionally has a charging current connection 207, allowing the high-voltage battery 204 to be charged by way of a further inverter 203. In the case of the conventional electric vehicle 201, BEV, as in FIG. 2c, there is a high-voltage battery 204, which can be charged via a high-voltage lead harness 206, jacketed with the adhesive tape of the invention, from the charging current connection 207.

Figure 3A:
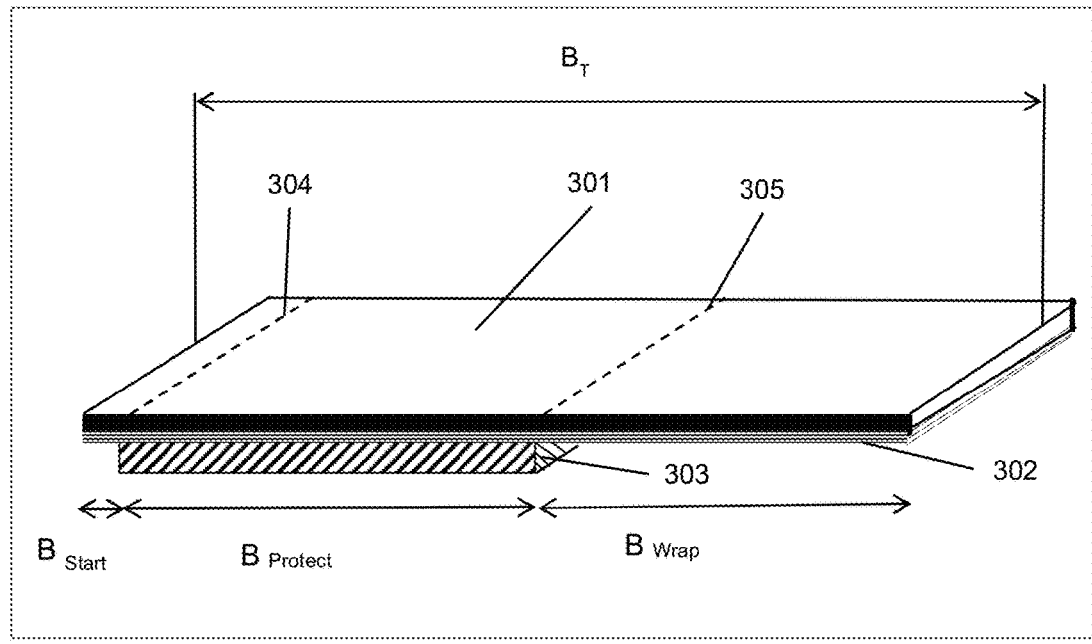
FIGS. 3a, 3b and 3c show the adhesive tape in different forms in lateral section.

FIG. 3a shows the variant of the adhesive tape in which the width $B_{Protect}$ of the second carrier in the form of the metallic layer 303 on the adhesive layer 302 is selected such that the width $B_{Protect}$ is less than the width $B_T$ of the first carrier 301, specifically such that the first carrier 301 protrudes, with the adhesive layer 302 applied preferably over the full area, on both sides relative to the side edges of the second carrier 303, to form a second protrusion having a width $B_{Wrap}$.

The adhesive tape according to FIG. 3a has a first carrier 301 of woven fabric with a width $B_T$. On the top side of the first carrier 301 there are two marker lines (marker line start 304, marker line end 305) disposed above the long edges of the second carrier 303.

Applied on the bottom side of the first carrier 301, over the full area, is an adhesive 302. Applied beneath the adhesive 302 is the second carrier 303, which has a lower width $B_{Protect}$ than the first carrier 301. The second carrier 303 leaves two stripes of adhesive free on either side, with the respective widths $B_{start}$ and $B_{Wrap}$.

The first stripe of adhesive is used for preliminary securement, while the second secures the adhesive tape after wrapping.

Figure 3B:
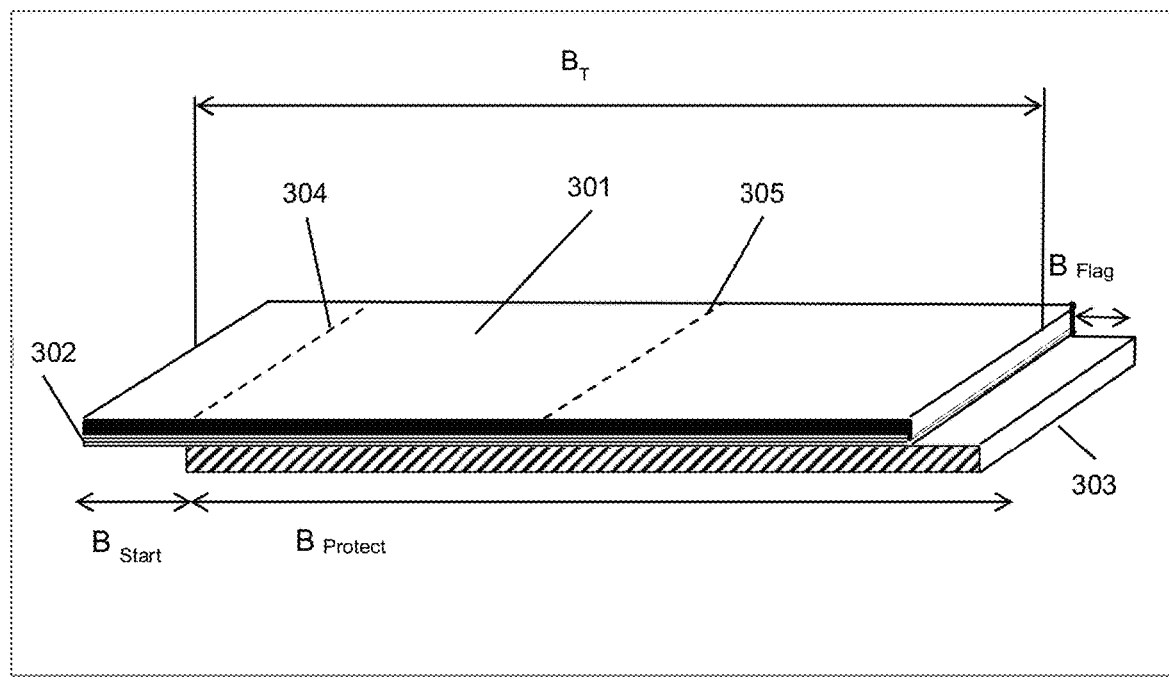

FIG. 3b shows the (second) variant of the adhesive tape, wherein the width $B_{Protect}$ of the second carrier in the form of the metallic layer 303 on the adhesive layer 302, applied preferably over the full area, is selected such that the second carrier 303 protrudes with the adhesive layer 302 relative to the second side edge of the first carrier 301, to form a second protrusion having a width $B_{Flag}$.

The width $B_{protect}$ selected for the second carrier 303 is (slightly) greater than the width $B_T$ of the first carrier 301, and so the width $B_{start}$ of the first protrusion is less than the width $B_{Flag}$ of the second protrusion.

Figure 3C:
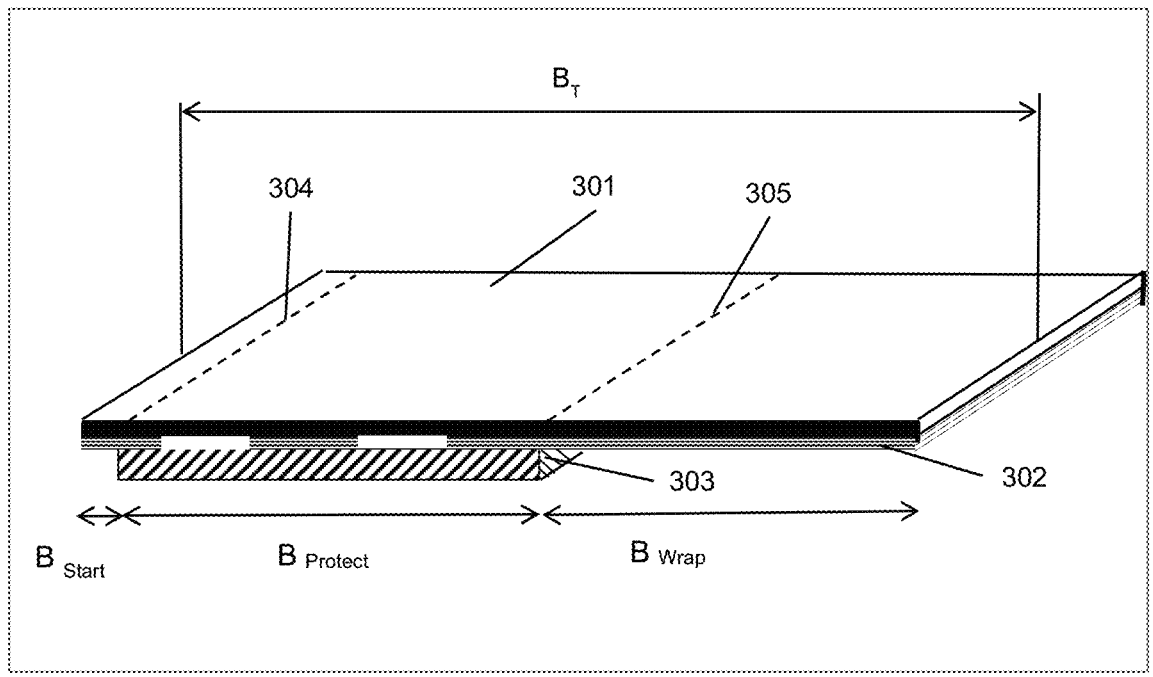

FIG. 3c shows the adhesive tape according to FIG. 3a, but the layer 302 of adhesive is not applied over the full area of the first carrier 301; instead, there are two adhesive-free stripes in the layer 302, these stripes being located above the second carrier 303. This makes the adhesive tape more flexible.

Figure 4A:
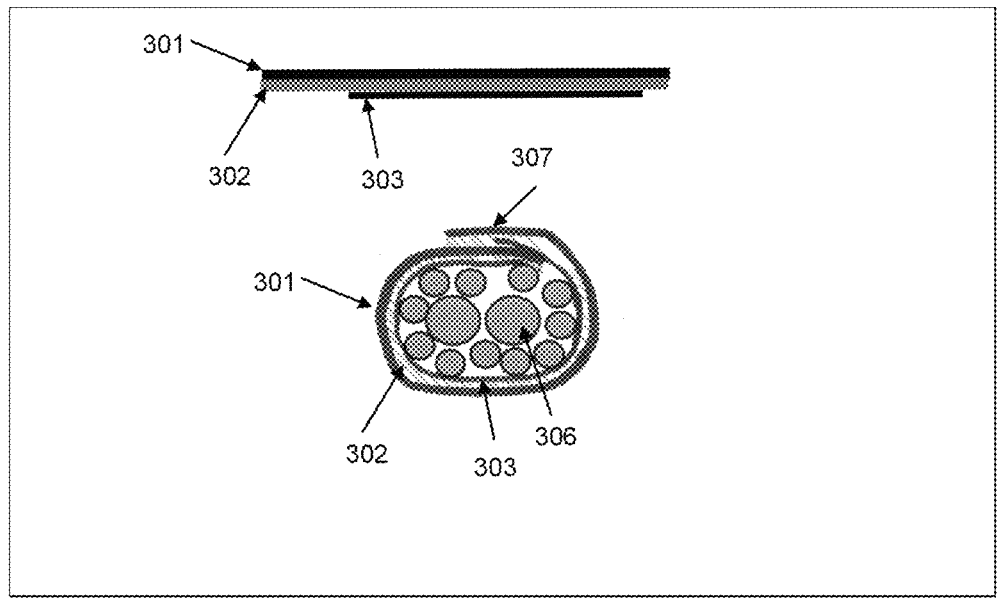
FIGS. 4a and 4b show longitudinal bandaging of the cable loom with an adhesive tape as in FIG. 3a, where the metallic layer (a) does not or (b) does form a ring closure.

In FIG. 4a the adhesive tape as per FIG. 3a is wrapped axially—that is, in the form of an Archimedean spiral, around a cable harness 306, so that the latter is completely surrounded (360°).

The second carrier 303 leaves two stripes of adhesive free on either side, with the respective widths $B_{start}$ and $B_{Wrap}$. The first stripe of adhesive with width $B_{start}$ serves for preliminary securement of the adhesive tape on the cable harness 306. The cable harness 306 is then wrapped such that there is an overlap 307 for sealing the adhesive tape, said overlap 307 having the width $B_{Wrap}$.

The jacketing is carried out such that the metallic layer 303 does not form a ring closure.

Figure 4B:
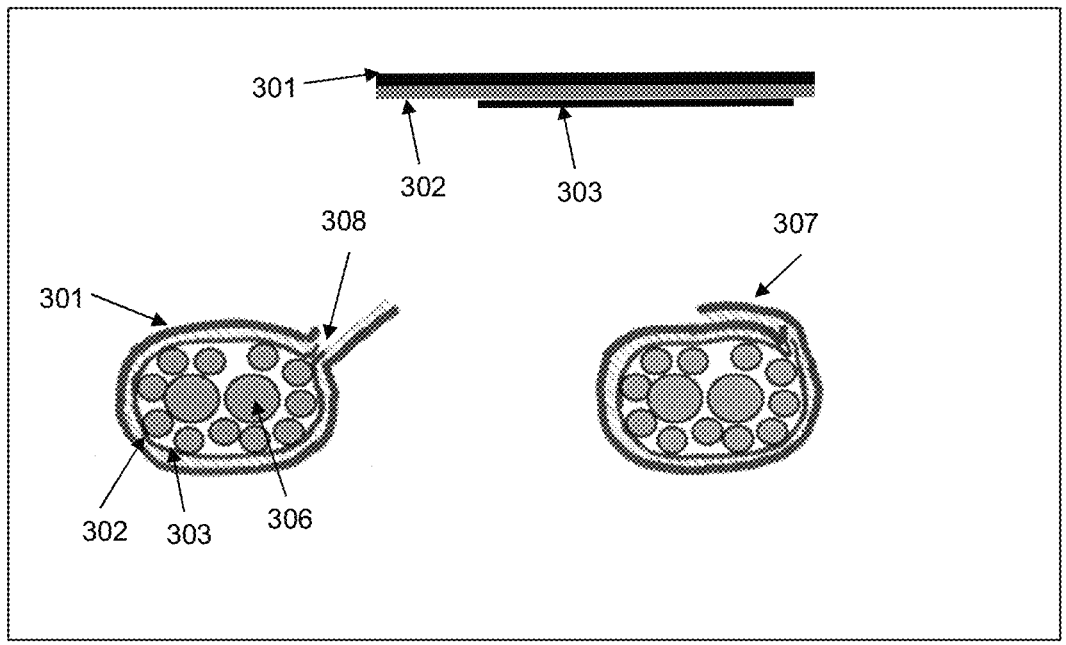

In FIG. 4b the adhesive tape as per FIG. 3a is wrapped likewise axially—that is, in the form of an Archimedean spiral, around a cable harness 306, so that the latter is completely surrounded (360°).

The second carrier 303 leaves two stripes of adhesive free on either side, with the respective widths $B_{start}$ and $B_{Wrap}$. The first stripe of adhesive with width $B_{start}$ serves for preliminary securement of the adhesive tape on the cable harness 306. The cable harness 306 is then wrapped such that there is an overlap 307 for sealing the adhesive tape, said overlap 307 having the width $B_{Wrap}$.

The jacketing this time is performed such that the metallic layer 303 does form a ring closure and there is therefore a contact area 308.

Figure 5A:
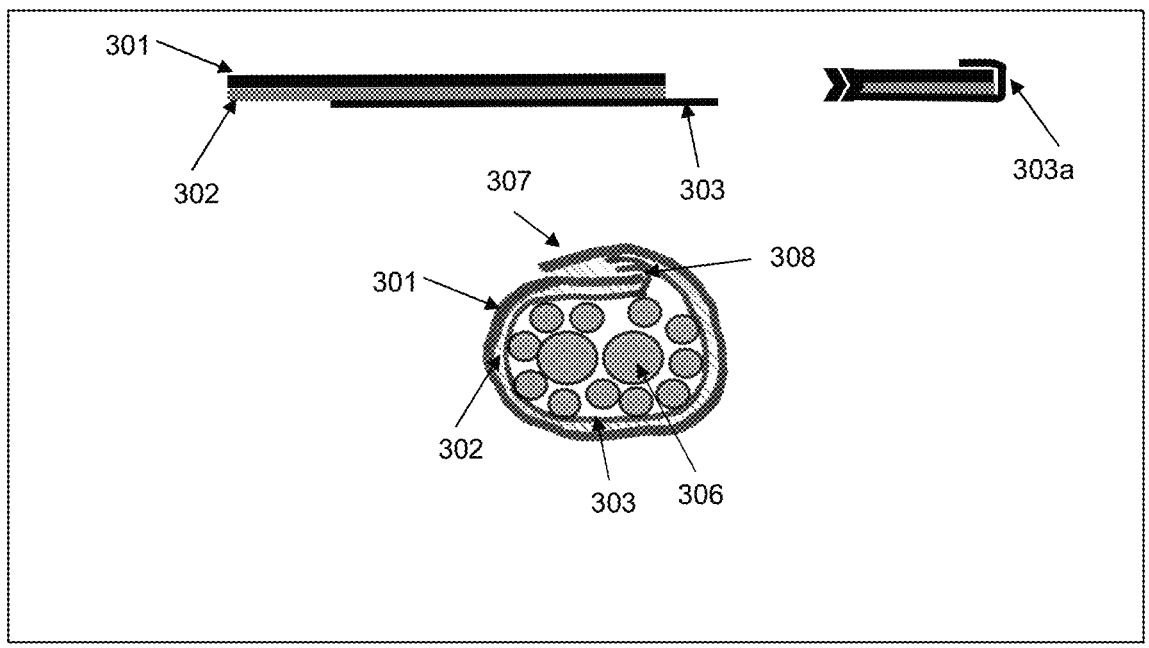
FIGS. 5a and 5b show longitudinal bandaging of the cable loom with an adhesive tape as per FIG. 3b, where (a) the metallic layer forms a ring closure or (b) there is a drain line in the metallic layer.

In FIG. 5a the adhesive tape as per FIG. 3b is wrapped axially—that is, in the form of an Archimedean spiral, around a cable harness 306, so that the latter is completely surrounded (360°).

The second carrier 303 protrudes relative to the second side edge of the first carrier 301 with the adhesive layer 302, to form a second protrusion 303a having a width $B_{Flag}$. Before the cable loom 306 is wrapped, the second protrusion 303a is folded over the second edge of the first carrier 301, so that the second side edge is surrounded by the metallic layer 303.

The jacketing is then performed such that the metallic layer 303 forms a ring closure via the contact area 308.

Figure 5B:
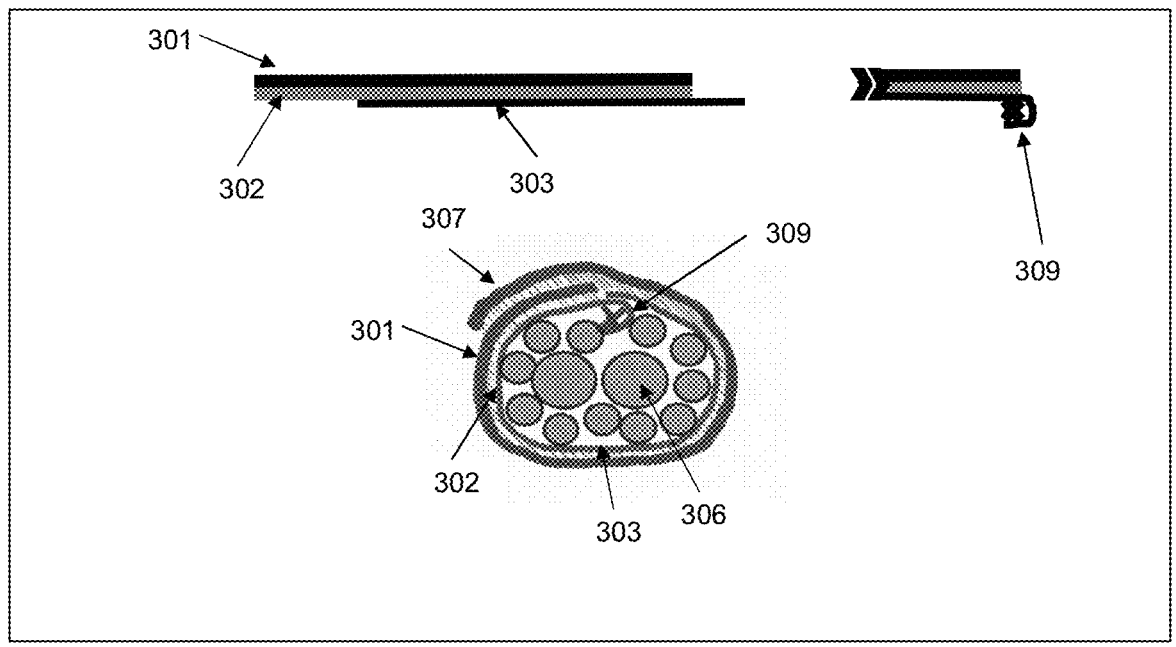

In FIG. 5b the adhesive tape as per FIG. 3b is wrapped likewise axially—that is, in the form of an Archimedean spiral, around a cable harness 306, so that the latter is completely surrounded (360°).

The second carrier 303 protrudes relative to the second side edge of the first carrier 301 with the adhesive layer 302, to form a second protrusion 303a having a width $B_{Flag}$. Before the cable loom 306 is wrapped, the second protrusion 303a is folded around an uninsulated drain line 309, so that the drain line 309 is surrounded by the metallic layer 303.

The jacketing is then preferably performed such that the metallic layer 303 additionally forms a ring closure via the contact area 308.

Implementation of the Tests

Unless expressly stated otherwise, the measurements are carried out under test conditions of 23±1° C. and 50±5% relative humidity.

Abrasion Resistance of an Adhesive Tape

Within the motor vehicle industry, adhesive tapes for cable jacketing are tested and classified in accordance with extensive bodies of standards such as, for example, the VW 60360-3 "Protective systems for wiring harnesses in motor vehicles, Test requirements for hoses" (2019-05), the BMW GS 95008-3-1 "Protective systems for wiring harnesses in motor vehicles, Adhesive tapes, Requirements, Tests" or the ES-KU5T-1A303-AA rev. E (2017/06) "Harness Tape Performance Specification". These standards are referred to below in abbreviated form as the VW, BMW and Ford specifications, respectively.

The abrasion resistance of an adhesive tape and protective hose is determined by BMW and VW likewise on the basis of a defined test method. The classification of the adhesive tapes and hoses in terms of their abrasion resistance is shown in Table 1 (classification of adhesive tape abrasion resistance to BMW GS 95008-3-1) for a mandrel diameter of 5 mm; adhesive tapes and hoses are arranged according to identical abrasion classes, and hoses may additionally be tested at an elevated ambient temperature (see Table 2: Classification of hose abrasion resistance to VW 60360-3).

TABLE 1

Classification of adhesive tape abrasion resistance to BMW GS 95008-3-1

| Abrasion class (at RT) | Requirement |
|---|---|
| A no abrasion protection | <100 double strokes |
| B little abrasion protection | 100 to 499 double strokes |
| C moderate abrasion protection | 500 to 999 double strokes |
| D high abrasion protection | 1000 to 4999 double strokes |
| E very high abrasion protection | 5000 to 14999 double strokes |
| F extremely high abrasion protection | 15000 to 29999 double strokes |
| G Abrasion protection for special applications | ≥30000 double strokes |

TABLE 2

Classification of hose abrasion resistance to VW 60360-3

| Abrasion class | | | | |
|---|---|---|---|---|
| At RT | At 40° C. | At 90° C. | | Requirement |
| A | AT40 | AT90 | no abrasion protection | <100 double strokes |
| B | BT40 | BT90 | little abrasion protection | 100 to 499 double strokes |
| C | CT40 | CT90 | moderate abrasion protection | 500 to 999 double strokes |
| D | DT40 | DT90 | high abrasion protection | 1000 to 4999 double strokes |
| E | ET40 | ET90 | very high abrasion protection | 5000 to 14999 double strokes |
| F | FT40 | FT90 | extremely high abrasion protection | 15000 to 29999 double strokes |
| G | GT40 | GT90 | abrasion protection for special applications | ≥30000 double strokes |

The test element 103, with a length of 10 cm, is wound as a single ply around a 5 mm thick steel mandrel 102, in the lengthwise direction of the product under test, and placed in a sample holder 101. The test element 103 is held down by a hold-down element 104. In the case of an adhesive tape system which is not the same over the full area, the part tested for abrasion is that which constitutes the protective function in use. The abrading tool is a steel wire 105 0.45 mm in diameter, which is caused to rub centrally over the test element 103 under a weight loading of 7 N (generated by an applied weight 106), with a drive 108 causing the steel wire to move back and forth in a cyclical movement 107 parallel to the axis of the steel mandrel 102. The numerical parameter for the abrasion properties is the number of double strokes performed until the test element 103 is destroyed.

Measurement of the abrasion resistance permits simulation of the resistance to relatively sharp objects such as a metal edge in the application, for example.

The method of abrasion measurement is shown in FIG. 1.

Bending Force

Measurement of the suppleness is a key quality feature of textiles, leather, paper and plastics having flexurally slack properties. The testing of the bending force, by the softometer method, serves to determine the suppleness or stiffness of the sheetlike materials in a comparable way, under specified conditions.

For determining the bending force on an expanse of textile, a sample specimen measuring 75×60 mm is punched out. A rotatably mounted sample holder comprising two parallel plates secures the punched-out sample over an area of 60×60 mm. The sample holder with the sample is pivoted against a force sensor, so that the portion of the sample that is not clamped in, with a length of 15 mm, is bent by 30°. The bending force required in this position is measured after a measuring time of 10 s as the bending force in the unit mN.

To describe the textile properties, a sample can be punched out in machine and cross directions and also, if the application requires it, in a diagonal direction, for the measurement. The extension in the direction of the sample side 75 mm long in this case also describes the bending direction which is to be assessed.

Flexural stiffness, MD: the longer side of the test specimen extends parallel to the machine direction of the material or warp direction of the woven fabric Flexural stiffness, CD: the longer side of the test specimen extends at right angles to the machine direction of the material or warp direction of the woven fabric In all cases, the direction of bending of the test specimen corresponds to the subsequent use of the adhesive tape—that is, the material with EMC protective function faces the leads of the cable harness.

With regard to the basis weight, the twin-ply region is contemplated; single-ply edge regions have the holding and securing function.

Electromagnetic Shielding/Attenuation

The high-voltage jacketed leads with braided shielding are used for supplying electrical drives in motor vehicles. The properties of such leads are determined by testing according to BMW standard GS 95007-6-2. The high-frequency properties and the attenuation provided by the surrounding shield are performed in the frequency range from 100 Hz to 200 MHz. The use of other materials as a substitute or as a supplement to the known braided shields is measured and evaluated for high-frequency capacity by comparison with these. The test is carried out using a high-voltage lead with a lead cross section of 35 mm$^2$. The test lead is provided with a shield, applied to the lead over a length of 100 cm, and secured in an electrically conducting manner at both ends. Measurement generators (transmitters) installed in the network analyzer feed the object of measurement and at the same time capture the changes in signal occurring via the measurement receiver in the network analyzer, in the frequency range from 100 Hz to 30 MHz the attenuation (measured in dB) provided by the shield used around the high-voltage lead is measured.

EXAMPLES

Outline of the Examples

The adhesive tape of the invention is described below in a preferred embodiment by means of a number of examples, without any intention thereby to subject the invention to any restriction whatsoever.

In addition, a comparative example is given, which shows an unsuitable adhesive tape.

|  | A | B | C | D | E |
|---|---|---|---|---|---|
| Material type adhesive tape | Woven PET adhesive tape | — | — | Woven PET adhesive tape | Woven PET adhesive tape |
| Material type EMC protection | — | Aluminium adhesive tape | Aluminium adhesive tape | Aluminium adhesive tape (B) | Aluminium adhesive tape (C) |
| Basis weight [g/m$^2$] | 230 | 115 | 250 | 345 | 480 |
| Thickness [μm] | 260 | 65 | 125 | 325 | 385 |
| Flexural stiffness MD [mN] | 16.1 | 48 | 290 | 134 | 395 |
| Flexural stiffness CD [mN] | 5.4 | 49 | 301 | 118 | 388 |
| Abrasion 5 mm mandrel [double strokes] | 1268 | 30 | 394 | 1423 | 1857 |
| Attenuation in [db(A)] | 2 | 0 | 0 | 2 | 2 |

-continued

|  | F | G | H | I |
|---|---|---|---|---|
| Material type adhesive tape | — | — | Woven PET fabric | Woven PET fabric |
| Material type EMC protection | Spunbonded PET, metal-coated | Woven PET Ripstop fabric, metal-coated | Nonwoven (F) | Woven fabric (G) |
| Basis weight [g/m²] | 85 | 80 | 315 | 310 |
| Thickness [μm] | 130 | 92 | 380 | 350 |
| Flexural stiffness MD [mN] | 74 | 22 | 211 | 130 |
| Flexural stiffness CD [mN] | 67 | 21 | 185 | 108 |
| Abrasion 5 mm mandrel [double strokes] | 122 | 427 | 1678 | 2236 |
| Attenuation in [db(A)] | 1 | 1 | 2.5 | 2 |

|  | J | K | L |
|---|---|---|---|
| Material type adhesive tape | Nonwoven PET adhesive tape | Nonwoven PET adhesive tape | Nonwoven PET adhesive tape |
| Material type EMC protection | — | Aluminium adhesive tape (B) | Nonwoven (F) |
| Basis weight [g/m²] | 140 | 255 | 325 |
| Thickness [μm] | 250 | 195 | 260 |
| Flexural stiffness MD [mN] | 2.5 | 51 | 76 |
| Flexural stiffness CD [mN] | 4.0 | 54 | 70 |
| Abrasion 5 mm mandrel [double strokes] | 110 | 223 | 205 |
| Attenuation in [db(A)] | 6.0 | 6.0 | 6.5 |

Flexural stiffness, MD: the longer side of the test specimen extends parallel to the machine direction of the material or warp direction of the woven fabric
Flexural stiffness, CD: the longer side of the test specimen extends at right angles to the machine direction of the material or warp direction of the woven fabric The direction of bending of the test specimen corresponds in all cases to the subsequent use of the adhesive tape; that is, the material with EMC protective function faces the leads of the cable harness.

With regard to basis weight, the double-ply region is contemplated; single-ply edge regions have the holding function and securing function.

Figure 6:
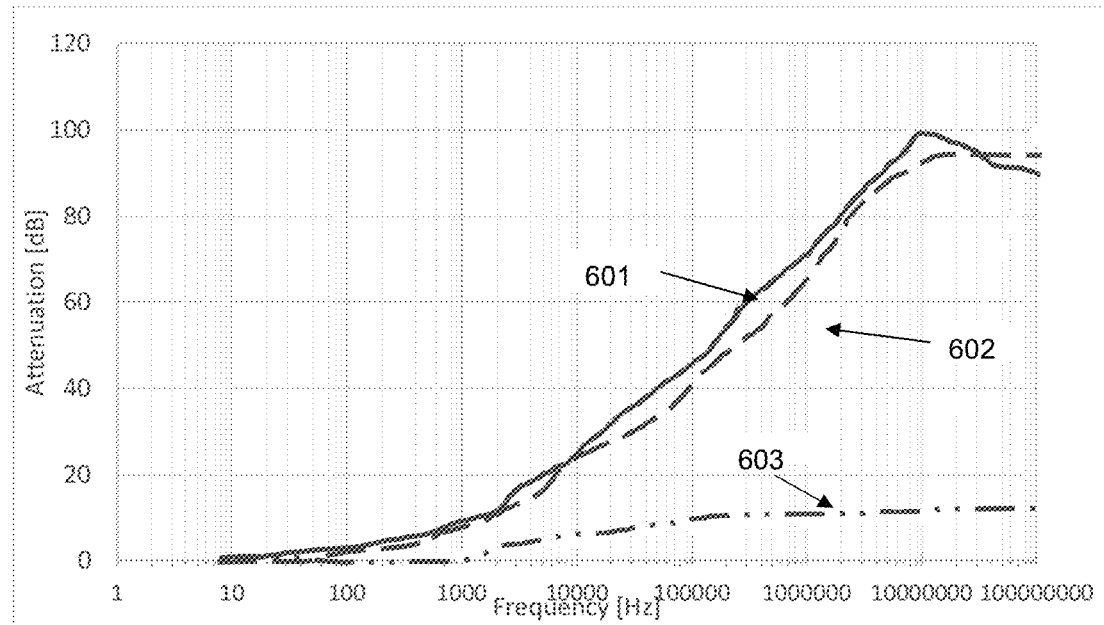
FIG. 6 shows the results of attenuation measurements.

The results of the attenuation measurement are reported in FIG. 6.

It is apparent that the attenuation achieves the values for a braided shield in the case of longitudinal bandaging. The attenuation values in the case of spiral bandaging are lower.

LIST OF REFERENCE SYMBOLS

101 Sample holder
102 Steel mandrel
103 Test element
104 Hold-down element
105 Replaceable steel wire
106 Applied weight
107 Cyclical movement
108 Drive
201 Hybrid vehicle, HEV/Plug-in hybrid vehicle, PHEV/electric vehicle, BEV
202 Electric motor
203 Inverter
204 High-voltage battery
205 Motor lead harness
206 High-voltage lead harness
207 Charging current connection
301 First carrier
302 Applied adhesive
303 Second carrier
303a Second protrusion
304 Marker line start
305 Marker line end
306 Cable harness in the form of various leads
307 Overlap for sealing the adhesive tape
308 Contact area
309 Drain line
601 High-voltage lead 35 mm² with braided shield 602 High-voltage lead 35 mm² with longitudinal aluminium/woven fabric bandaging 603 High-voltage lead 35 mm² with spiral aluminium/woven fabric bandaging

The invention claimed is:

1. An elongate item jacketed with an adhesive tape, wherein the adhesive tape comprises: (A) a first carrier having a top side and a bottom side, the first carrier, based on a cross direction, having a width $B_T$, and (B) at least one layer of adhesive applied on the bottom side of the first carrier, the adhesive layer bearing a second carrier, the first carrier with the adhesive layer protruding at least on one long edge relative to a side edge of the second carrier, where a first protrusion of the first carrier has a width of $B_{Start}$, wherein the first carrier is a woven fabric or a nonwoven fabric, the second carrier is a metallic layer, the first carrier has a basis weight of 50 g/m² to 600 g/m², the second carrier is conductive in the transverse and longitudinal directions, and the second carrier forms an electrically conducting ring closure directed towards a periphery of the elongate item.

2. The elongate item jacketed with an adhesive tape according to claim 1, wherein a width $B_{Protect}$ of the second carrier on the adhesive layer is selected such that the width $B_{Protect}$ is lower than the width $B_T$ of the first carrier such that the first carrier with the adhesive layer protrudes two-sidedly relative to side edges of the second carrier, so as to form a second protrusion having a width $B_{Wrap}$.

3. The elongate item jacketed with an adhesive tape according to claim 1, wherein a width $B_{Protect}$ of the second carrier on the adhesive layer is selected such that the second carrier protrudes relative to a second side edge of the first carrier with the adhesive layer, so as to form a second protrusion having a width $B_{Flag}$.

4. The elongate item jacketed with an adhesive tape according to claim 3, wherein $B_{start}$ has a width of 3 to 20 mm, $B_{Protect}$ has a width of 50 to 200 mm, $B_{Wrap}$ has a width of 50 to 200 mm, and/or $B_{Flag}$ has a width of 50 to 200 mm.

5. The elongate item jacketed with an adhesive tape according to claim 1, wherein the construction of the woven fabric is as follows:

the warp thread count is 10 to 60/cm the weft thread count is 10 to 40/cm the warp threads possess a yarn weight between 40 and 400 dtex, the weft threads possess a yarn weight between 40 and 660 dtex.

6. The elongate item jacketed with an adhesive tape according to claim 1, wherein the nonwoven fabric is a spunbonded web.

7. The elongate item jacketed with an adhesive tape according to claim 1, wherein the adhesive has a coatweight, based on an area of the carrier between 40 and 160 g/m².

8. The elongate item jacketed with an adhesive tape according to claim 1, wherein the metallic layer used comprises aluminium foil having a thickness of 15 to 100 µm, copper foil having a thickness of 10 to 80 µm, stainless steel foil having a thickness of 10 to 60 µm, layer laminates of a polymeric film and metallic surface, metallized woven or nonwoven fabrics.

9. The elongate item jacketed with an adhesive tape according to claim 1, wherein an acrylate-based adhesive is used as adhesive.

10. The elongate item jacketed with an adhesive tape according to claim 1, wherein at least one marker line extending in a longitudinal direction is present on the top side of the first carrier.

11. A vehicle comprising the elongate item jacketed with an adhesive tape according to claim 1.

12. A method of jacketing an elongate item with an adhesive tape, said method comprising enveloping the elongate item with the adhesive tape in an axial direction, wherein the adhesive tape comprises: (A) a first carrier having a top side and a bottom side, the first carrier, based on a cross direction, having a width $B_T$, and (B) at least one layer of adhesive applied on the bottom side of the first carrier, the adhesive layer bearing a second carrier, the first carrier with the adhesive layer protruding at least on one long edge relative to a side edge of the second carrier, where a first protrusion of the first carrier has a width of $B_{start}$, wherein the first carrier is a woven fabric or a nonwoven fabric, the second carrier is a metallic layer, the first carrier has a basis weight of 50 g/m² to 600 g/m², the second carrier is conductive in the transverse and longitudinal directions, and the second carrier forms an electrically conducting ring closure directed towards a periphery of the elongate item.

* * * * *